US012548518B2

(12) United States Patent
Kim et al.

(10) Patent No.: US 12,548,518 B2
(45) Date of Patent: Feb. 10, 2026

(54) PIXEL, DISPLAY DEVICE REDUCING STATIC POWER CONSUMPTION AND DRIVING METHOD THEREOF

(71) Applicant: SAPIEN SEMICONDUCTORS INC., Gyeonggi-do (KR)

(72) Inventors: Ji Han Kim, Seoul (KR); Jin Woong Jang, Seoul (KR); Ji Haeng Lee, Gyeonggi-do (KR); Dae Young Jung, Gyeonggi-do (KR); Jong Gu Jeon, Gyeonggi-do (KR)

(73) Assignee: SAPIEN SEMICONDUCTORS INC., Gyeonggi-do (KR)

( * ) Notice: Subject to any disclaimer, the term of this patent is extended or adjusted under 35 U.S.C. 154(b) by 0 days.

(21) Appl. No.: 18/942,298

(22) Filed: Nov. 8, 2024

(65) Prior Publication Data

US 2025/0124872 A1 Apr. 17, 2025

Related U.S. Application Data

(63) Continuation of application No. 18/487,188, filed on Oct. 16, 2023, now Pat. No. 12,175,937, which is a (Continued)

(30) Foreign Application Priority Data

Mar. 11, 2022 (KR) ........................ 10-2022-0030704

(51) Int. Cl.
*G09G 3/3233* (2016.01)

(52) U.S. Cl.
CPC ... *G09G 3/3233* (2013.01); *G09G 2300/0852* (2013.01); *G09G 2300/0857* (2013.01);
(Continued)

(58) Field of Classification Search
CPC ......... G09G 3/3233; G09G 2300/0852; G09G 2300/0857; G09G 2310/061;
(Continued)

(56) References Cited

U.S. PATENT DOCUMENTS

| | | | | |
|---|---|---|---|---|
| 7,405,713 B2 * | 7/2008 | Koyama | ............. | G09G 3/3266 345/82 |
| 2003/0011408 A1 * | 1/2003 | Tsuchi | ................ | G09G 3/2011 327/108 |

(Continued)

FOREIGN PATENT DOCUMENTS

KR 10-2017-0111788 A 10/2017

OTHER PUBLICATIONS

Office action for parent U.S. Appl. No. 17/852,942 dated Feb. 16, 2023.

(Continued)

*Primary Examiner* — Jeff Piziali
(74) *Attorney, Agent, or Firm* — Eschweiler & Potashnik, LLC; Harris Kim

(57) ABSTRACT

A pixel module comprises a scan driver to output first signals, a data driver to output second signals, and a plurality of pixel circuits for driving an LED with PWM signals. Each pixel circuit comprises a first memory configured to store image data to drive the light-emitting diode, a second memory configured to store charging control data indicating charging timings or a number of charging times of a capacitor, and a PWM pixel driver comprising the capacitor configured to be chargeable when a supply of a bias voltage is turned on based on the charging control data, a charge controller configured to output a charging control signal according to the charging control data, and a PWM control element configured to control a power supply to the light-emitting diode, wherein the second signals transmit the
(Continued)

image data to the first memory and the charging control data to the second memory.

6 Claims, 8 Drawing Sheets

Related U.S. Application Data continuation of application No. 17/852,942, filed on Jun. 29, 2022, now abandoned.

(52) U.S. Cl.
CPC ... *G09G 2310/061* (2013.01); *G09G 2310/08* (2013.01); *G09G 2330/021* (2013.01)

(58) Field of Classification Search
CPC ......... G09G 2310/08; G09G 2330/021; G09G 2320/064; G09G 3/32; G09G 2300/08; G09G 2300/0842
See application file for complete search history.

(56) References Cited

U.S. PATENT DOCUMENTS

| | | | | |
|---|---|---|---|---|
| 2006/0054893 | A1* | 3/2006 | Nathan | H10D 86/00 257/E27.111 |
| 2011/0254850 | A1* | 10/2011 | Kikuta | G09G 3/3233 345/520 |
| 2011/0254874 | A1* | 10/2011 | Kikuta | G09G 3/2092 345/690 |
| 2015/0103104 | A1* | 4/2015 | Lee | G09G 3/3648 345/690 |
| 2016/0063965 | A1* | 3/2016 | Yoo | G09G 3/3406 345/428 |
| 2016/0125785 | A1* | 5/2016 | Wang | G09G 3/3648 345/582 |
| 2016/0210900 | A1* | 7/2016 | Kim | G09G 3/3266 |
| 2016/0307509 | A1* | 10/2016 | Nie | G09G 3/3258 |
| 2016/0314740 | A1* | 10/2016 | Wu | G09G 3/3291 |
| 2016/0343318 | A1* | 11/2016 | Wang | G09G 3/3614 |
| 2016/0379564 | A1* | 12/2016 | Inoue | G05F 3/262 345/212 |
| 2017/0287429 | A1* | 10/2017 | Kong | G09G 3/3607 |
| 2017/0345375 | A1* | 11/2017 | Cho | G09G 3/3275 |
| 2018/0040301 | A1* | 2/2018 | Bae | G09G 5/363 |
| 2018/0075801 | A1* | 3/2018 | Le | G09G 3/3233 |
| 2020/0160778 | A1 | 5/2020 | Lee et al. | |
| 2021/0225320 | A1* | 7/2021 | Sin | G09G 5/003 |
| 2021/0335219 | A1* | 10/2021 | Halbritter | G09G 3/2014 |

OTHER PUBLICATIONS

Offce action for parent U.S. Appl. No. 18/487,188 dated May 8, 2024.

* cited by examiner

| Cap data | # of Refresh |
|---|---|
| 000 | All times |
| 001 | 1 time |
| 010 | 2 time |
| 011 | 3 time |
| 100 | 4 time |
| 101 | 5 time |
| 110 | 6 time |
| 111 | 7 time |

PIXEL, DISPLAY DEVICE REDUCING STATIC POWER CONSUMPTION AND DRIVING METHOD THEREOF

CROSS-REFERENCE TO RELATED APPLICATIONS

This application is a continuation of U.S. application Ser. No. 18/487,188 filed on Oct. 16, 2023, which is continuation of a U.S. application Ser. No. 17/852,942 filed on Jun. 29, 2022, which is based on and claims priority under 35 USC § 119 to Korean Patent Application No. 10-2022-0030704, filed on Mar. 11, 2022, in the Korean Intellectual Property Office, the disclosures of which are incorporated by reference herein in their entirety.

TECHNICAL FIELD

The present disclosure relates to display devices and pixel modules included in the display device.

BACKGROUND

The content described in this section merely provides background information for the embodiments described herein and does not necessarily constitute prior art.

A typical display device is configured by arranging a plurality of pixels M×N. Each pixel is usually composed of three light-emitting elements (R, G, B), and each light-emitting element is called a sub-pixel.

Among various methods of controlling the driving of sub-pixels is a PWM control method in which video data for controlling light emission of a sub-frame during one frame is stored in a built-in memory and gradation is controlled through a pulse width modulation (PWM) signal. For PWM control, a pixel driving circuit for driving each pixel may be implemented as a transistor, but may be classified as a digital circuit and an analog circuit according to an operation region of the transistor.

A digital circuit operates in a blocking region and a non-saturation region corresponding to ON-OFF to represent “0” and “1”. Meanwhile, analog circuits such as AMP or bias (excluding analog switches) operate in the saturation region, so a constant current should be continuously consumed during an operation time of the circuit. However, the same power may not always be required depending on a display driving mode or screen, and therefore, a method for reducing static power consumption in the pixel driving circuit is needed.

BRIEF SUMMARY

The present disclosure provides a pixel driving circuit capable of reducing power consumed for pixel driving by reducing the number of times a capacitor is charged.

The present disclosure is not limited to the aforementioned problems, and other problems not mentioned will be clearly understood by those skilled in the art from the following description.

Additional aspects will be set forth in part in the description which follows and, in part, will be apparent from the description, or may be learned by practice of the presented embodiments of the disclosure.

According to an aspect of the present disclosure, there is provided a pixel driving circuit including: a video memory configured to store video data related to driving of a plurality of light-emitting devices; a plurality of sub-pixel driving units, respectively corresponding to the plurality of light-emitting devices, configured to supply power to the plurality of light-emitting devices according to the video data stored in the video memory, each of the plurality of sub-pixel driving units having a capacitor unit for charging power required for driving each of the plurality of light-emitting devices; a charge control memory configured to store data related to charging of the capacitor unit; and a charge controller configured to control whether the capacitor unit is charged according to charge control data stored in the charge control memory.

According to an embodiment of the present disclosure, a value stored in the charge control memory may be a value related to the number of times of charging of the capacitor unit during 1 period, and the charge controller may output a charge control signal for controlling charging of the capacitor unit according to the value stored in the charge control memory.

According to an embodiment of the present disclosure, each sub-pixel driving unit may include a cap charge unit connected between a pixel positive power and a pixel negative power; and a cap discharge unit connected between the pixel positive power and the pixel negative power.

According to an embodiment of the present disclosure, the capacitor unit may be connected between the cap charge unit and the cap discharge unit, and each sub-pixel driving unit may further include a cap charge control switch unit connected between the cap charge unit and the capacitor unit.

According to an embodiment of the present disclosure, the cap charge control switch unit may be turned on or turned off by the charge control signal output from the charge controller.

According to an embodiment of the present disclosure, the capacitor unit may include: a first capacitor connected between a first connection line connecting the cap charge unit to the cap discharge unit and the pixel negative power; and a second capacitor connected between a second connection line connecting the cap charge unit to the cap discharge unit and the pixel negative power.

According to an embodiment of the present disclosure, the cap charge unit may include a first cap charge transistor and a second cap charge transistor respectively connected to the first capacitor and the second capacitor between the pixel positive power and the pixel negative power.

According to an embodiment of the present disclosure, the cap discharge unit may include a first cap discharge transistor and a second cap discharge transistor respectively connected to the first capacitor and the second capacitor between the pixel positive power and the pixel negative power.

According to an embodiment of the present disclosure, the cap charge control switch unit may include: a first charge control switching element connected between the first cap charge transistor and the first capacitor; and a second charge control switching element connected between the second cap charge transistor and the second capacitor.

According to an embodiment of the present disclosure, the cap charge control switch unit may further include a third charge control switching element connected between the first cap charge transistor and the second cap charge transistor.

According to an embodiment of the present disclosure, each sub-pixel driving unit may further include a pulse width modulation (PWM) switching element connected in series with the cap discharge unit between the pixel positive power and the pixel negative power. The PWM switching element may be turned on or turned off according to the video data stored in the video memory.

A pixel driving circuit according to the present disclosure may be a component of a display device including a display panel including a plurality of pixel driving circuits; a scan driving circuit configured to sequentially output a row signal to pixel driving circuits arranged in a row direction, among the plurality of pixel driving circuits included in the display panel; and a data driving circuit configured to output a column signal related to driving of a plurality of light-emitting devices corresponding to respective pixel driving circuits to pixel driving circuits arranged in a vertical direction, among the plurality of pixel driving circuits included in the display panel.

The row signal and the column signal may be signals having a charge control data write period, a video data write period, and a PWM driving period every 1 period.

The row signal and the column signal may be signals having a video data write period and a PWM driving period every 1 period, after a signal having one charge control data write period is output.

The row signal and the column signal may be signals having a video data write period and a PWM driving period every 1 period, after a signal having a charge control data write period is output every preset period.

Other specific details of the present disclosure are included in the detailed description and drawings.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
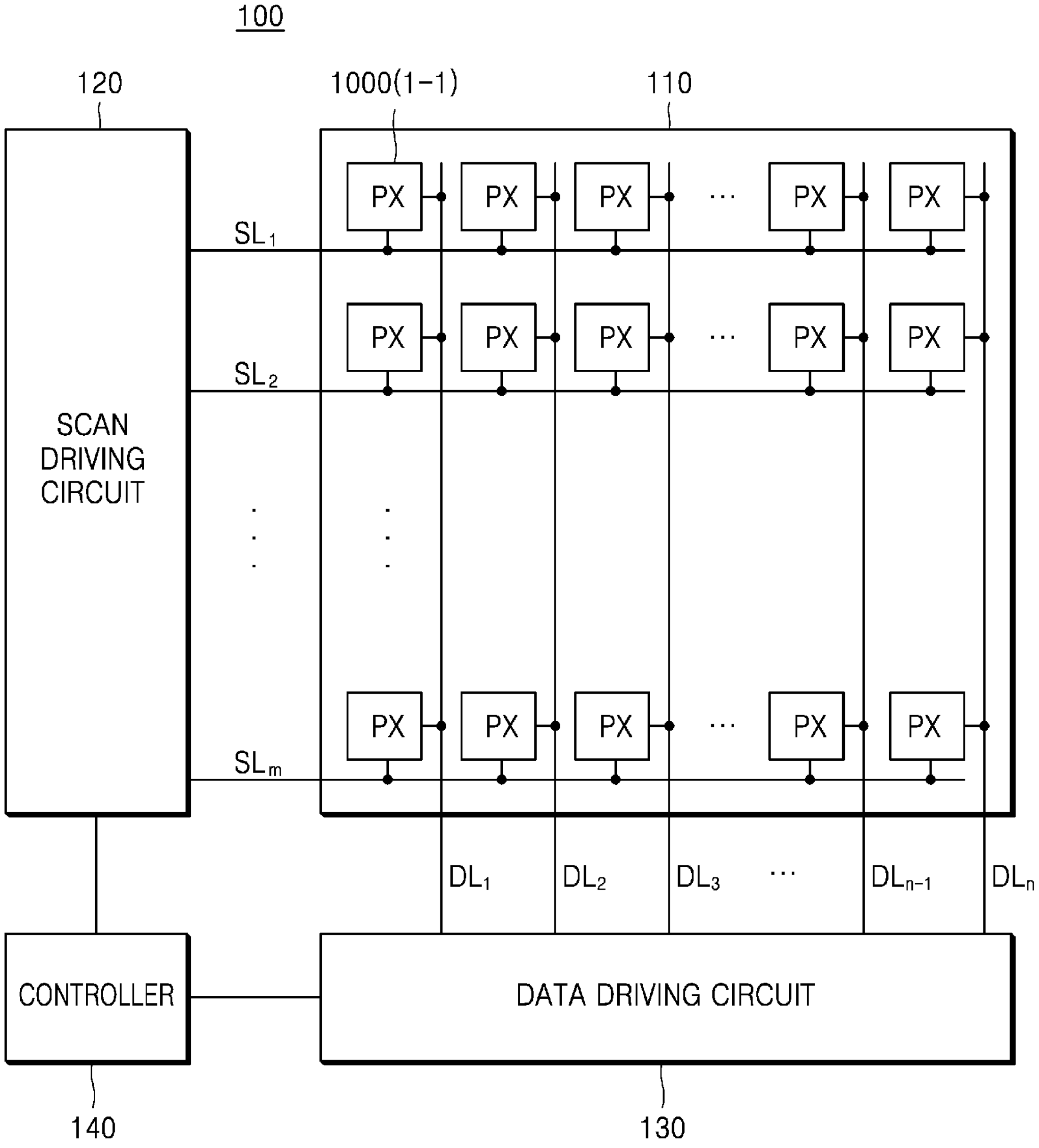
FIG. 1 is a display device including a plurality of pixels according to the present disclosure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. The embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Advantages and features of the invention disclosed herein, and methods of achieving them will become apparent with reference to the embodiments described below in detail in conjunction with the accompanying drawings. However, the present disclosure is not limited to the embodiments disclosed below, but may be implemented in various different forms, and the present embodiments are provided so that this disclosure will be thorough and complete, and will fully convey the scope of the present disclosure to those skilled in the art. Further, the present disclosure is only defined by scopes of claims.

The terminology used herein is for the purpose of describing the embodiments and is not intended to limit the scope of the present disclosure. In the present disclosure, the singular also includes the plural unless specifically stated otherwise in the phrase. As used herein, "comprises" and/or "comprising" does not exclude the presence or addition of one or more other components in addition to the stated components.

Like reference numerals refer to like elements throughout, and "and/or" includes each and every combination of one or more of the recited elements. Although "first", "second", etc. are used to describe various elements, these elements are not limited by these terms, of course. These terms are only used to distinguish one component from another. Accordingly, a first component mentioned below may be a second component within the spirit of the present disclosure.

In the following embodiments, "ON" used in connection with a device state may refer to an activated state of the device, and "OFF" may refer to an inactive state of the device. As used in connection with a signal received by a device, "ON" may refer to a signal that activates a device, and "OFF" refers to a signal that deactivates a device. The device may be activated by a high voltage or a low voltage. For example, a P-type transistor is activated by a low voltage, and an N-type transistor is activated by a high voltage. Accordingly, it should be understood that the "ON" voltages for a P-type and N-type transistor have opposite (low vs. high) voltage levels.

When one element is referred to as "connected to" another element, it includes both direct connection to another element or intervening another element in the middle. Hereinafter, embodiments of the present disclosure are described in detail with reference to the accompanying drawings.

FIG. 1 is a display device including a plurality of pixels according to the present disclosure.

Referring to FIG. 1, the display device 100 according to the present disclosure may include a display panel 110, a scan driving circuit 120, a data driving circuit 130, and a controller 140.

The display panel 110 may include a plurality of pixels PX according to the present disclosure. The pixels PX, as m*n (m and n are natural numbers) numbers of pixels PX, may be arranged in a matrix form. However, the pixels may be arranged in various patterns according to embodiments, such as a zigzag form.

The display panel 110 may be implemented as one of a liquid crystal display (LCD), a light-emitting diode (LED) display, an organic LED (OLED) display, an active-matrix OLED (AMOLED) display, an electrochromic display (ECD), a digital mirror device (DMD), an actuated mirror device (AMD), a grating light valve (GLV), a plasma display panel (PDP), an electroluminescent display (ELD), a vacuum fluorescent display (VFD), and may also be implemented as other types of flat panel displays or flexible displays. In the present disclosure, the LED display panel is described as an example.

Each pixel PX may include a light-emitting device or a plurality of light-emitting devices. The light-emitting device may be an LED. The LED may be a micro LED having a size of 80 μm or less. One pixel PX may output various colors through light-emitting devices having different colors. For example, one pixel PX may include light-emitting devices having red, green, and blue colors. As another example, a white light-emitting device may be further included, and the white light-emitting device may replace any one of the red, green, and blue light-emitting devices. Alternatively, one pixel may include one white light-emitting device. When a plurality of light-emitting devices is included in each pixel PX, each light-emitting device included in one pixel PX is referred to as a "sub-pixel".

Each pixel PX may include a pixel driving circuit for driving the sub-pixels. The pixel driving circuit may drive a turn-on or turn-off operation of a sub-pixel in response to a signal output from the scan driving circuit 120 and/or the data driving circuit 130. The pixel driving circuit may include at least one thin film transistor (TFT) and at least one capacitor. The pixel driving circuit may be implemented by a stack structure on a semiconductor wafer.

The display panel 110 may include scan lines $SL_1$ to $SL_m$ arranged in a row direction and data lines $DL_1$ to $DL_n$ arranged in a column direction. Pixels PX may be positioned at intersections of the scan lines $SL_1$ to $SL_m$ and the data lines $DL_1$ to $DL_n$. Each pixel PX may be connected to any one scan line $SL_k$ and any one data line $DL_k$. The scan lines $SL_1$ to $SL_m$ may be connected to the scan driving circuit 120, and the data lines $DL_1$ to $DL_n$ may be connected to the data driving circuit 130.

The scan driving circuit 120 may drive pixels connected to any one of the scan lines $SL_1$ to $SL_m$. The scan driving circuit 120 may sequentially select the scan lines $SL_1$ to $SL_m$. For example, pixels connected to the first scan line $SL_1$ may be driven during a first scan driving period, and pixels connected to the second scan line $SL_2$ may be driven during a second scan driving period. The operation of the scan driving circuit 120 according to the present disclosure is described in more detail below.

The data driving circuit 130 may output a signal related to gradation to each pixel through the data lines $DL_1$ to $DL_n$. Although one data line is connected to a plurality of pixels in a longitudinal direction, a signal related to gradation may be input only to pixels connected to the scan line selected by the scan driving circuit 120. The operation of the data driving circuit 130 according to the present disclosure is described in more detail below.

The controller 140 may output a control signal to execute the operations of the scan driving circuit 120 and the data driving circuit 130. The controller 140 may output a control signal corresponding to image data corresponding to one image frame to each of the scan driving circuit 120 and the data driving circuit 130.

Figure 2:
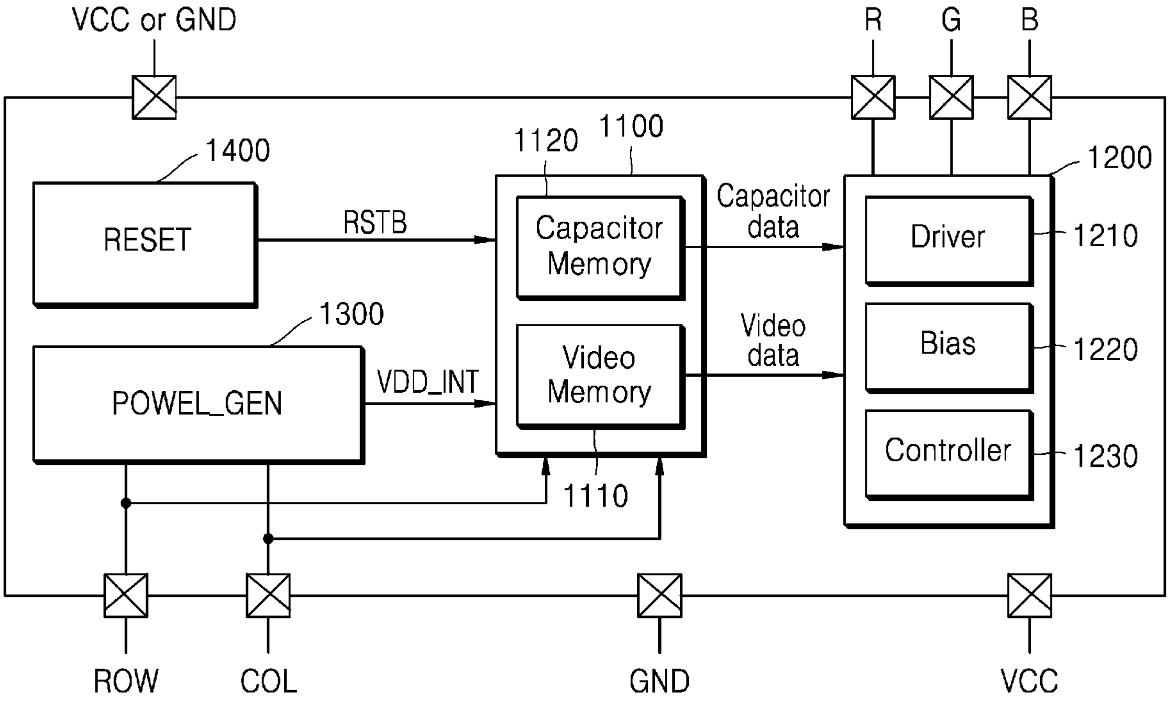
FIG. 2 is a block diagram schematically illustrating the configuration of a pixel driving circuit according to an embodiment of the present disclosure.

FIG. 2 is a block diagram schematically illustrating a configuration of a pixel driving circuit 1000 according to an embodiment of the present disclosure.

Referring to FIG. 2, the pixel driving circuit 1000 according to an embodiment of the present disclosure may include a pixel memory unit 1100 and a pixel driving unit 1200. In addition, the pixel driving circuit 1000 may include a terminal VCC or GND for receiving power, terminals R, G, and B for outputting a light emission control signal to light-emitting devices, a terminal ROW for receiving a row signal output from the scan driving circuit 120, and a terminal COL for receiving a column signal output from the data driving circuit 130. An electrical connection is configured so that power and signals may be input and output through the terminals.

The pixel memory unit 1100 may include a video memory 1110 and a charge control memory 1120. The video memory 1110 may store data related to driving of a plurality of light-emitting devices (e.g., LEDs), that is, video data. The video data is data on the gradation for the light-emitting device to emit light during one frame or one pulse width modulation (PWM) period. The charge control memory 1120 may store data related to charging of a capacitor unit 1211 included in the pixel driving unit 1200. The charge control memory 1120 and the capacitor unit 1211 are described in more detail below.

The pixel driving unit 1200 may control power supply to a plurality of light-emitting devices according to video data stored in the video memory 1110. The pixel driving unit 1200 controls power supply to the light-emitting device according to a so-called PWM driving method, and because the PWM driving method is known to those skilled in the art, a detailed description thereof is omitted.

The pixel driving circuit 1000 according to an embodiment of the present disclosure may further include a power generating unit (POWER_GEN) 1300. The power generating unit 1300 may output a reference voltage VDD to the pixel memory unit 1100 using the row signal output from the scan driving circuit 120 and the column signal output from the data driving circuit 130. The configuration and operation of the power generating unit 1300 is described below.

The pixel driving circuit 1000 according to an embodiment of the present disclosure may further include a reset unit (RESET) 1400 outputting a reset signal RSTB for initializing data stored in the pixel memory unit 1100 to the pixel memory unit 1100. The configuration and operation of the reset unit 1400 are described below.

Figure 3:
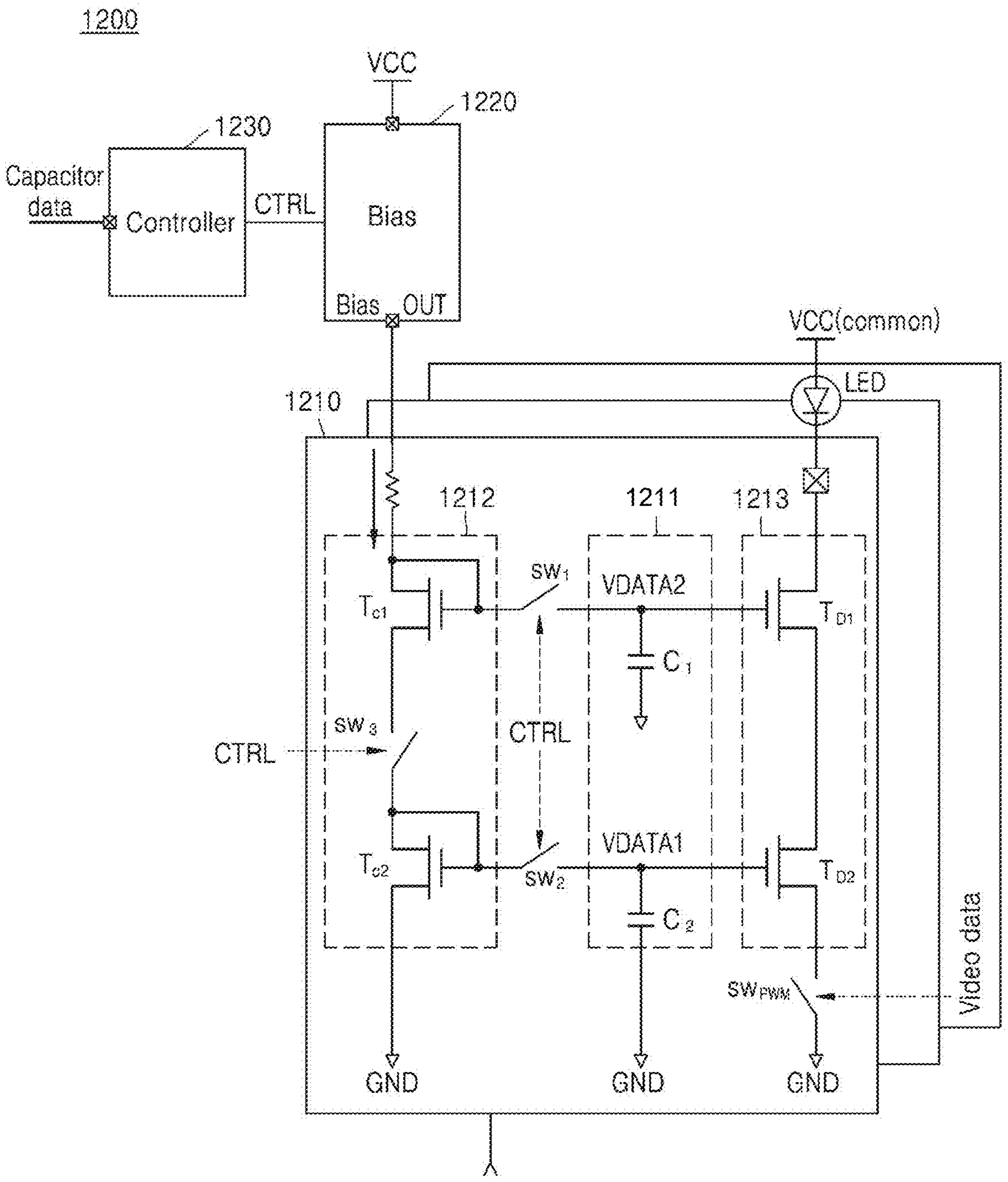
FIG. 3 is a schematic block diagram of a configuration of a pixel driving unit according to an embodiment of the present disclosure.

FIG. 3 is a schematic block diagram of a configuration of the pixel driving unit 1200 according to an embodiment of the present disclosure.

Referring to FIG. 3, the pixel driving unit 1200 according to an embodiment of the present disclosure may include a sub-pixel driving unit 1210, a bias unit (BIAS) 1220, and a charge controller 1230.

The sub-pixel driving unit 1210 corresponds to each light-emitting device (LED). A pixel includes a plurality of light-emitting devices (LEDs), and thus, the pixel driving unit 1200 includes a plurality of sub-pixel driving units 1210, and the sub-pixel driving units 1210 correspond to the light-emitting devices (LEDs), respectively. The sub-pixel driving units 1210 may supply power to the light-emitting devices according to video data stored in the video memory 1110, respectively. Each sub-pixel driving unit 1210 may have a capacitor unit 1211 for charging power required to drive each light-emitting device (LED).

The bias unit 1220 may serve to supply bias power to each of the sub-pixel driving units 1210. To this end, the bias unit 1220 may be connected to a terminal VCC through which the pixel driving circuit 1000 is supplied with power. In this case, whether power is supplied to the sub-pixel driving unit 1210 by the bias unit 1220 may be controlled by a control signal CTRL of the charge controller 1230. Power supplied by the bias unit 1220 may be stored in the capacitor unit 1211.

The charge controller 1230 may control whether the capacitor unit 1211 is charged according to the charge control data (capacitor data) stored in the charge control memory 1120.

Figure 4:
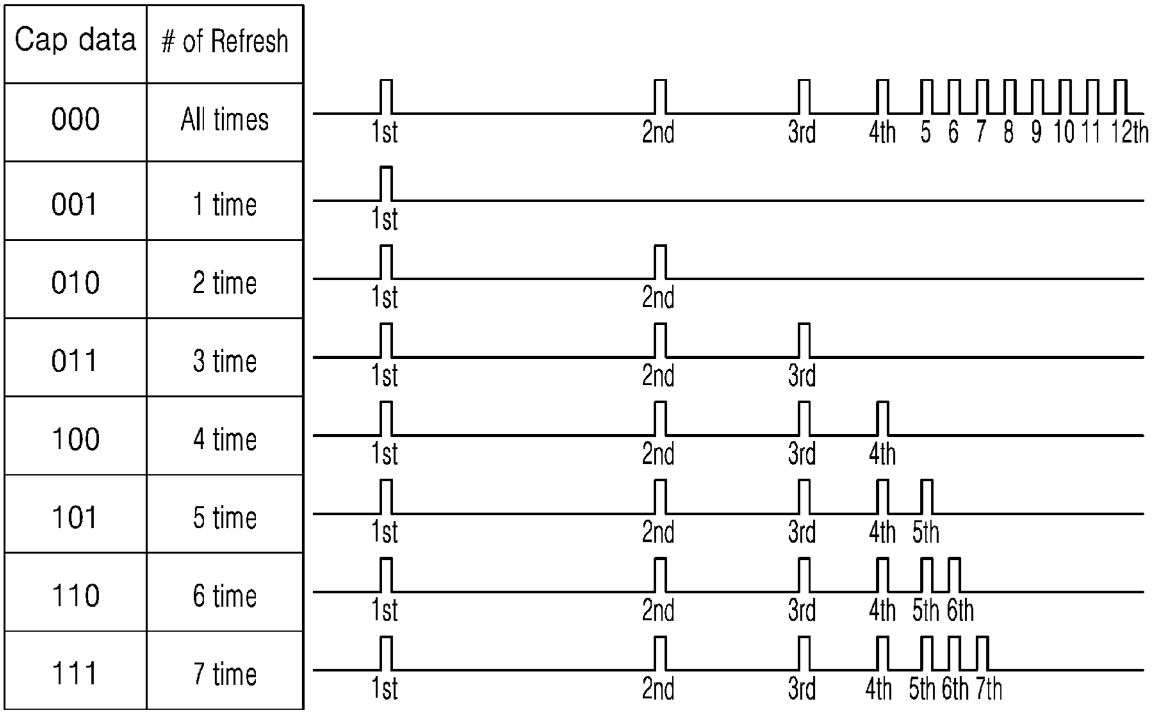
FIG. 4 is an example of the number of charge times of a capacitor unit according to the charge control data.

FIG. 4 is an example of the number of charge times of the capacitor unit according to the charge control data.

Referring to FIG. 4, an example in which the charge control data (capacitor data) stored in the charge control memory 1120 is illustrated to be 3-bits. Also, in the example shown in FIG. 4, video data has 12 bits. For example, when the charge control data is <000>, the charge controller 1230 may output a control signal so that the capacitor unit 1211 is charged all 12 times within one period. When the charge control data is <001>, the charge controller 1230 may output a control signal so that the capacitor unit 1211 is charged only once within one period. When the charge control data is <010>, the charge controller 1230 may output a control signal so that the capacitor unit 1211 is charged twice within one period. When the charge control data is <011>, the charge controller 1230 may output a control signal so that the capacitor unit 1211 is charged three times within one period. That is, the value stored in the charge control memory 1120 may be a value related to the number of times the capacitor unit 1211 is charged during 1 period, and the charge controller 1230 may output a charge control signal for controlling charging of the capacitor unit 1211 according to the value stored in the charge control memory 1120. However, the example shown in FIG. 4 is for illustrative purposes, and the number of bits of the charge control data (capacitor data) and the number of times of charging according to the charge control data may be set to be various and are not limited to the example.

Each sub-pixel driving unit 1210 is described in more detail with reference back to FIG. 3. Each sub-pixel driving unit 1210 may include a capacitor unit 1211, a cap charge unit 1212, a cap discharge unit 1213, and a cap charge control switch unit SW. The cap charge unit 1212 may be connected between a pixel positive power and a pixel negative power. The cap discharge unit 1213 may be connected between the pixel positive power and the pixel negative power. The capacitor unit 1211 may be connected between the cap charge unit 1212 and the cap discharge unit 1213. The cap charge control switch unit SW may be connected between the cap charge unit 1212 and the capacitor unit 1211. The cap charge control switch unit SW may be turned on or off by the charge control signal CTRL output from the charge controller 1230.

The example shown in FIG. 3 is an example in which the capacitor unit 1211 includes two capacitors $C_1$ and $C_2$ (i.e., first and second capacitors $C_1$ and $C_2$). The first capacitor C1 may be connected between a first connection line connecting the cap charge unit 1212 to the cap discharge unit 1213 and the negative pixel power GND. The second capacitor C2 may be connected between a second connection line connecting the cap charge unit 1212 to the cap discharge unit 1213 and the negative pixel power GND. In this case, the cap charge unit 1212 may include a first cap charge transistor $T_{C1}$ and a second cap charge transistor TC2 respectively connected to the first capacitor $C_1$ and the second capacitor $C_2$ between the pixel positive power and the pixel negative power. The cap discharge unit 1213 may include a first cap discharge transistor $TD_1$ and a second cap discharge transistor $TD_2$ respectively connected to the first capacitor $C_1$ and the second capacitor $C_2$ between the pixel positive power and the pixel negative power. In addition, the cap charge control switch unit SW may include a first charge control switching element $SW_1$ connected between the first cap charge transistor $T_{C1}$ and the first capacitor $C_1$ and a second charge control switching element $SW_2$ connected between the second cap charge transistor $T_{C2}$ and the second capacitor $C_2$. The cap charge control switch unit SW may further include a third charge control switching element $SW_3$ connected between the first cap charge transistor $T_{C1}$ and the second cap charge transistor $T_{C2}$. In addition, each sub-pixel driving unit 1210 may further include a PWM switching element $SW_{PWM}$ connected with the cap discharge unit 1213 in series between the pixel positive power and the pixel negative power. The PWM switching element $SW_{PWM}$ may be turned on or off according to the video data stored in the video memory 1110.

Meanwhile, referring back to FIG. 2, the power generating unit 1300 uses may output a reference voltage VDD_INT to the pixel memory unit 1100 using the row signal output from the scan driving circuit 120 and the column signal output from the data driving circuit 130.

Figure 5:
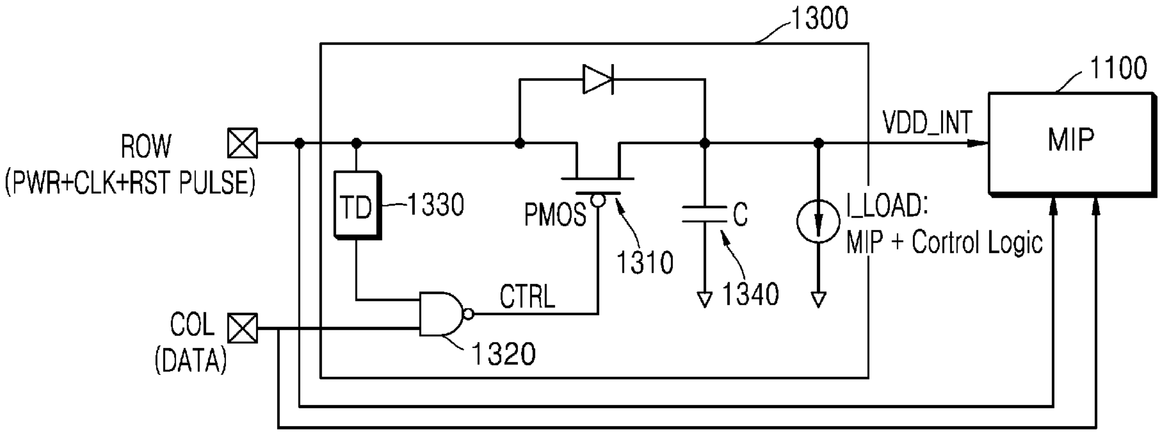
FIG. 5 is a circuit diagram of a power generating unit according to an embodiment of the present disclosure.

FIG. 5 is a circuit diagram of the power generating unit 1300 according to an embodiment of the present disclosure.

Referring to FIG. 5, the power generating unit 1300 according to an embodiment of the present disclosure may include a transistor 1310, a NAND gate 1320, and a time delay element 1330. The power generating unit 1300 may be connected to an input terminal ROW of a row signal and an input terminal COL of a column signal to receive the row signal and the column signal. Also, the power generating unit 1300 may include a reference voltage output terminal for outputting a reference voltage VDD_INT to the pixel memory unit 1100.

The transistor 1310 may be disposed between the input terminal ROW of the row signal and an output terminal of the reference voltage. According to an embodiment, the transistor 1310 may be a PMOSFET. A drain terminal and a source terminal of the PMOSFET may be connected to the input terminal ROW of the row signal and the output terminal of the reference voltage, and a gate terminal of the PMOSFET may be connected to a signal output terminal of the NAND gate. For reference, the PMOSFET may be turned off when a signal input to the gate terminal is logic high ("1"), and turned on when the signal input to the gate terminal is logic low ("0").

The NAND gate 1320 may be disposed between an intermediate terminal (the gate terminal) of the transistor 1310 and an input terminal of the column signal. The NAND gate 1320 is a logic circuit device, and may have two input terminals and one output terminal. The column signal may be input to one of the two input terminals, and a delayed row signal may be input to the other. For reference, the NAND gate 1320 outputs logic low only when the inputs are all logic high [1,1], and outputs logic high in other cases of [0,0], [1,0], and [0,1].

The time delay element 1330 may be disposed between the input terminal of the row signal and the NAND gate. The time delay element 1330 may receive the row signal, delay the row signal by a preset time, and output the delayed row signal to one of the input terminals of the NAND gate 1320. For example, the delay time may be 0.5 ns to 1 ns.

Figure 6A:
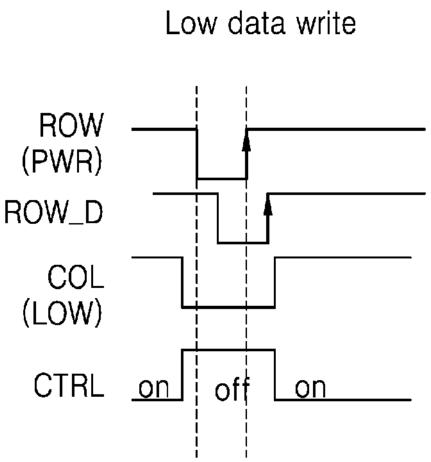
FIGS. 6A-6C are signal timing diagrams in which the power generating unit according to the present disclosure outputs a reference voltage using a row signal and a column signal.
Figure 6B:
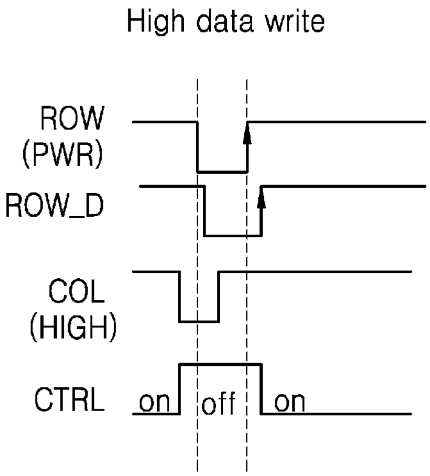
Figure 6C:
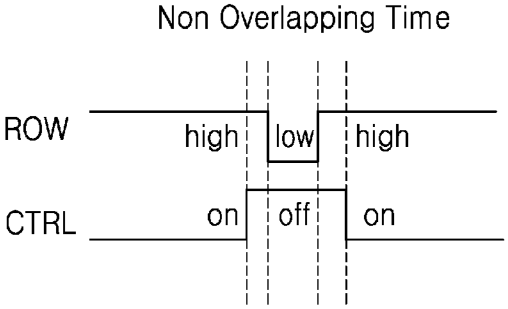

FIGS. 6A-6C are signal timing diagrams in which the power generating unit 1300 according to the present disclosure outputs a reference voltage using a row signal and a column signal.

Referring to FIGS. 6A-6C, "ROW" denotes a row signal input through the input terminal of the row signal, "ROW_D" denotes a row signal delayed after passing through the time delay element 1330, "COL" denotes a column signal input through the input terminal of the column signal, and "CTRL" denotes a signal output from the NAND gate 1320.

First, the row signal may have a characteristic of changing from a logic high state to a logic low state, maintaining logic low for a preset time, and then changing back to the logic high state. The column signal may also have a characteristic of changing from a logic high state to a logic low state, maintaining logic low for a preset time, and then changing back to the logic high state. In this case, the column signal may change from logic high to logic low slightly before the row signal enters the logic low state. In addition, when the data to be input to the pixel memory unit 1100 is logic low ("0") and logic high ("1"), there may be a time difference for maintaining logic low in the column signal. When the data corresponds to logic low ("0") data, the column signal may change from logic low to logic high after the row signal is changed to logic high (refer to FIG. 6A). When the data corresponds to logic high ("1") data, the column signal may change from logic low to logic high before the row signal is changed to logic high (refer to (FIG. 6B).

According to timings of the delayed row signal and the column signal, the signals may change from logic low to logic high and back to logic low in the NAND gate 1320. As described above, the PMOSFET 1310 may be turned on by a logic row signal, turned off by a logic high signal, and then turned on again by a logic row signal.

Referring to FIG. 6C, when the row signal ROW is logic high, the PMOSFET 1310 is in an ON state, and thus, the reference voltage VDD_INT may be output to the output terminal of the reference voltage. Meanwhile, because the PMOSFET 1310 is in an OFF state when the row signal ROW is logic high, the reference voltage VDD_INT at the output terminal of the reference voltage may be maintained. To this end, the power generating unit 1300 may further include a capacitor 1340 disposed between the output terminal of the reference voltage and a circuit ground. The capacitor 1340 may serve to maintain the reference voltage VDD_INT of the output terminal of the reference voltage because the PMOSFET 1310 is in an OFF state.

Now that the timing characteristics of the row signal and the column signal have been described, a method of inputting charge control data or video data to the pixel memory unit 1100 is described.

Figure 7:
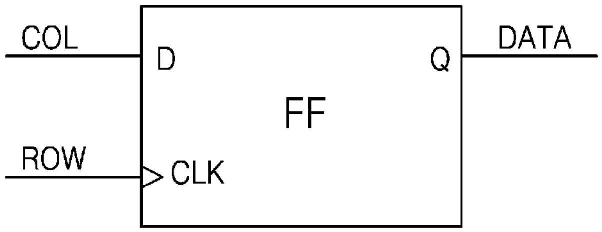
FIG. 7 is a block diagram schematically illustrating a configuration of a general flip-flop.

FIG. 7 is a block diagram schematically illustrating a configuration of a general flip-flop FF.

Referring to FIG. 7, the column signal may be input to a data signal input terminal D of the flip-flop FF, and the row signal may be input to a clock signal input terminal CLK. Referring back to FIG. 6A, when the column signal is in a logic low state the moment the row signal is changed from logic low to logic high (rising edge), logic low data ("0") may be input to the flip-flop FF. Also, referring to FIG. 6B, when the column signal is in a logic high state the moment the row signal is changed from logic low to logic high (rising edge), logic high data "1" may be input to the flip-flop FF. That is, in the present disclosure, while the reference power VDD_INT is output from the power generating unit 1300 through the timings of the row signal and the column signal as described above, the charge control data or video data may be input using the same signal at the same time. In the present disclosure, an example in which the pixel memory unit 1100 includes a plurality of flip-flops FF has been described, but the pixel memory unit 1100 is not limited by the above example.

Meanwhile, referring back to FIG. 2, the reset unit 1400 may output, to the pixel memory unit 1100, a reset signal RSTB for initializing the data stored in the pixel memory unit 1100 using the row signal and the column signal.

Figure 8:
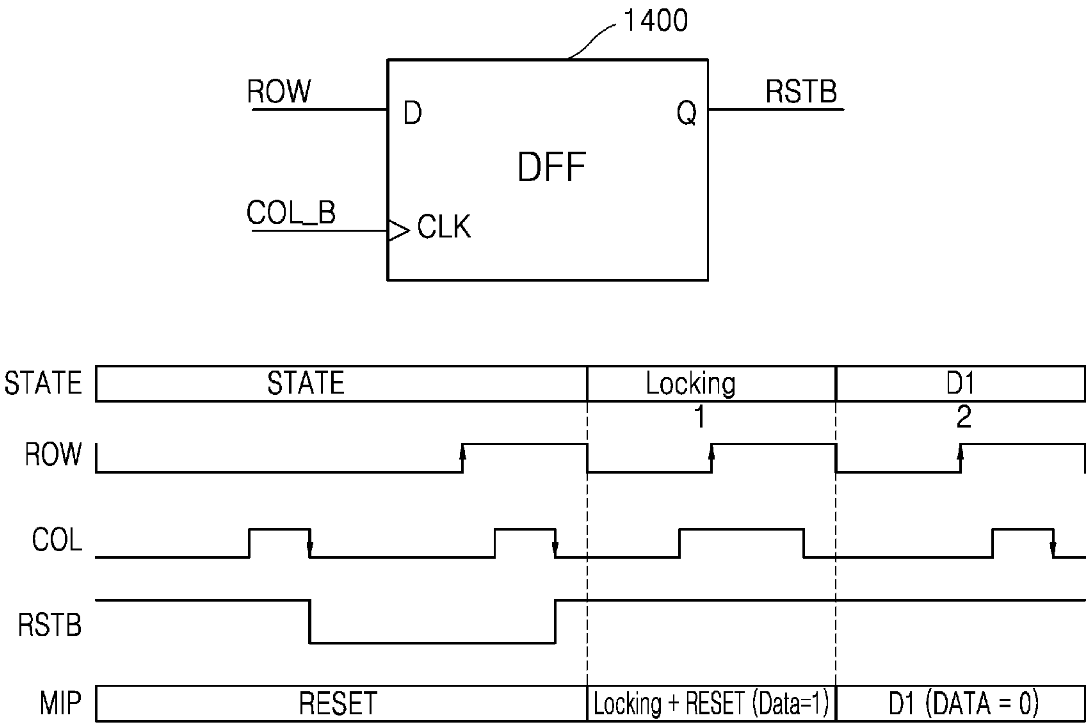
FIG. 8 is a timing reference diagram of a row signal and a column signal in a video data reset period according to an embodiment of the present disclosure.

FIG. 8 is a timing reference diagram of a row signal and a column signal in a video data reset period according to an embodiment of the present disclosure.

Referring to FIG. 8, the reset unit 1400 may have a data signal input terminal D to which the row signal is input, a clock signal input terminal CLK to which the column signal is input, and a signal output terminal from which the reset signal RSTB is output. In this case, the column signal input to the clock signal input terminal CLK may be input in a state in which the column signal output from the data driving circuit 130 is inverted. Accordingly, the reset unit 1400 may further include a signal inverter (not shown) connected to the clock signal input terminal CLK to invert the column signal.

In a video data reset period RESET, the scan driving circuit 120 may output a row signal maintaining a logic low state for a time longer than a reference interval. In the video data reset period RESET, the data driving circuit 130 may output a column signal changing from logic high to logic low, while the row signal maintains a logic low state. In the present disclosure, the reset signal RSTB may initialize data stored in the pixel memory unit 1200 at the moment of transition from logic high to logic low.

Figure 9A:
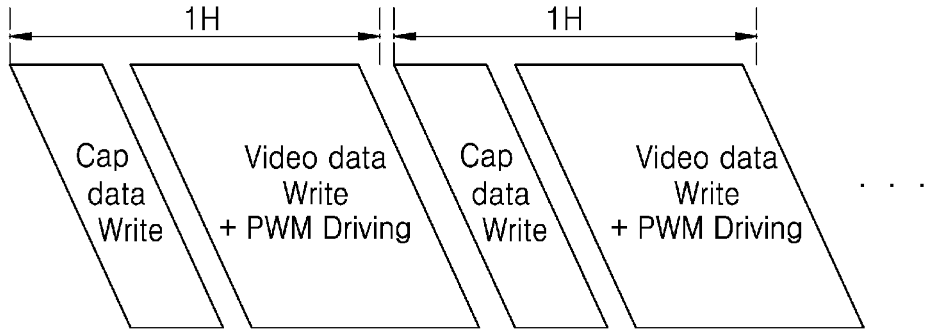
FIGS. 9A-9C are diagrams of various intervals for writing charge control data and video data according to the present disclosure.
Figure 9B:
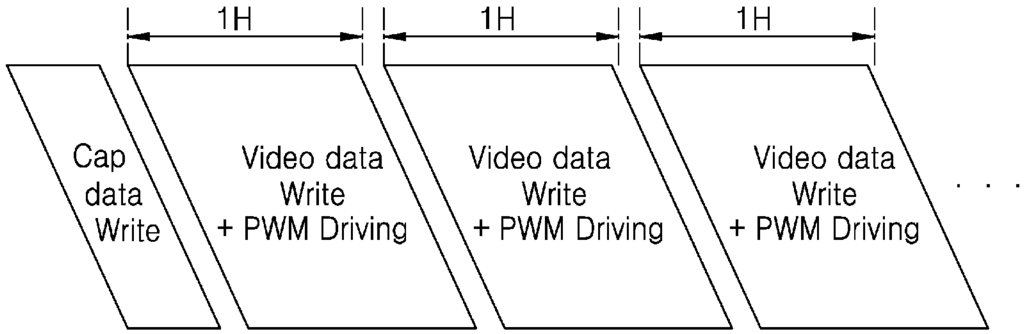
Figure 9C:
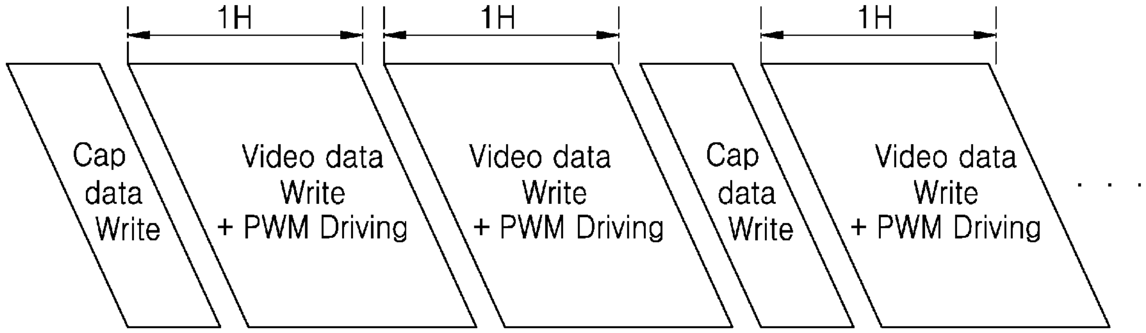

FIGS. 9A-9C are diagrams illustrating a write and PWM driving period of charge control data (capacitor data) and video data according to the present disclosure.

According to an embodiment of the present disclosure, the row signal and the column signal may be signals having a charge control data write period, a video data write period, and a PWM driving period every one period (1H) (refer to FIG. 9A). That is, the charge control data may be newly input every period.

According to another embodiment of the present disclosure, the row signal and the column signal may be signals having a video data write period and a PWM driving period every one period (1H) after a signal having a charge control data write period once is output (refer to FIG. 9B). That is, after the charge control data is initially input only once, the charge control data is not changed without a separate action. According to another embodiment of the present disclosure, the row signal and the column signal may be signals having a video data write period and a PWM driving period every one period after a signal having a charge control data write period is output every preset period (refer to FIG. 9C). That is, the charge control data may be newly input at regular intervals. The period H may be one frame, or may be a pre-divided interval within one frame.

The scan driving circuit and the data driving circuit may include processors, application-specific integrated circuits (ASICs), other chipsets, logic circuits, registers, communication modems, and data processing devices known in the art to execute various control logics described above. In addition, when the aforementioned control logic is implemented in software, the scan driving circuit and the data driving circuit may be implemented as a set of program modules. In this case, the program modules may be stored in the memory device and executed by the processor.

As mentioned above, although the embodiments of the present disclosure have been described with reference to the accompanying drawings, those skilled in the art to which the present disclosure pertains may understand that the present disclosure may be embodied in other specific forms without changing the technical spirit or essential features thereof.

Therefore, it should be understood that the embodiments described above are illustrative in all respects and not restrictive.

According to the present disclosure, power consumption for driving a pixel may be reduced by reducing the number of times the capacitor is charged.

Effects of the present disclosure are not limited to those mentioned above, and other effects not mentioned may be clearly understood by those skilled in the art from the following description.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

The invention claimed is:

1. A pixel module, comprising:

a scan driving circuit configured to output first signals;

a data driving circuit configured to output second signals; and a plurality of pixel circuits for driving a light-emitting diode with pulse width modulation (PWM) signals, each pixel circuit comprising:

a first memory configured to store image data to drive the light-emitting diode, a second memory configured to store charging control data indicating charging timings or a number of charging times of a capacitor, and a PWM pixel driver comprising:

the capacitor configured to be chargeable when a supply of a bias voltage is turned on based on the charging control data, a charge controller configured to output a charging control signal according to the charging control data, and a PWM control element configured to control a power supply to the light-emitting diode according to the PWM signals generated based on the image data, wherein the second signals transmit the image data to the first memory and the charging control data to the second memory.

2. The pixel module according to claim 1, wherein the first signals are row signals, and the second signals are column signals.

3. The pixel module according to claim 1, wherein the charging control data newly inputted every period.

4. The pixel module according to claim 1, wherein the charging control data are initially inputted to the plurality of pixel circuits once, and the image data are newly inputted every period.

5. The pixel module according to claim 1, wherein the charging control data are newly inputted every certain number of periods.

6. The pixel module according to claim 1, wherein the charge controller comprises a control switch that is connected between a bias circuit and the capacitor and is configured to turn on and off a supply of the bias voltage to the capacitor based on the charging control data.

* * * * *